US010449610B2

(12) United States Patent
Brambs et al.

(10) Patent No.: US 10,449,610 B2
(45) Date of Patent: Oct. 22, 2019

(54) METHOD FOR MACHINING FLAT SURFACES OF A WORKPIECE

(71) Applicant: Open Mind Technologies AG, Wessling (DE)

(72) Inventors: Peter Brambs, München (DE); Josef Koch, München (DE)

(73) Assignee: Open Mind Technologies AG, Wessling (DE)

( * ) Notice: Subject to any disclaimer, the term of this patent is extended or adjusted under 35 U.S.C. 154(b) by 0 days.

(21) Appl. No.: 15/559,464

(22) PCT Filed: Mar. 29, 2016

(86) PCT No.: PCT/EP2016/000527
§ 371 (c)(1),
(2) Date: Sep. 19, 2017

(87) PCT Pub. No.: WO2016/150575
PCT Pub. Date: Sep. 29, 2016

(65) Prior Publication Data
US 2018/0104749 A1 Apr. 19, 2018

(30) Foreign Application Priority Data
Mar. 26, 2015 (DE) .................. 10 2015 104 679

(51) Int. Cl.
B23C 3/00 (2006.01)
B23C 5/10 (2006.01)
G05B 19/4061 (2006.01)

(52) U.S. Cl.
CPC .............. *B23C 3/00* (2013.01); *B23C 5/10* (2013.01); *G05B 19/4061* (2013.01);
(Continued)

(58) Field of Classification Search
CPC ....... B23C 3/00; B23C 3/16; B23C 2210/084; B23C 2265/08; G05B 19/4061; G05B 2219/49149
See application file for complete search history.

(56) References Cited

U.S. PATENT DOCUMENTS

| 5,125,775 A | 6/1992 | Breuer et al. |
| 6,684,742 B1 | 2/2004 | White |

(Continued)

FOREIGN PATENT DOCUMENTS

| DE | 10144501 A1 | 5/2003 |
| DE | 10144508 A1 | 5/2003 |

(Continued)

OTHER PUBLICATIONS

English Translation of JP 2011251401, Dec. 2011.*

*Primary Examiner* — Alan Snyder
(74) *Attorney, Agent, or Firm* — Michael Soderman

(57) ABSTRACT

The invention relates to a method for machining flat surfaces (30) of a workpiece (32) using a tool (10), in particular a milling tool, which is moved in a collision-free and laterally inclined manner (α) relative to a flat surface (30) such that a contact point (34) is guided on the flat surface (30). The flat surface (30) is machined using a tool (10) with a cutting contour (18), which has a conically convex design, on one flank (16) of the tool (10) at a pivot angle (ß) parallel to the flat surface (30) in order to prevent a one-sided collision completely by the tool (10) and at at least two different pivot angles (ß, ß') parallel to the flat surface (30) in order to prevent a two-sided collision by the tool (10), wherein the flat surface (30) is separated into at least two machining segments (44, 44', 44"), each of which is assigned an individual pivot angle (ß, ß') of the tool (10) in order to prevent a two-sided collision.

19 Claims, 14 Drawing Sheets

(52) U.S. Cl.
CPC .... *B23C 2210/084* (2013.01); *B23C 2265/08* (2013.01); *B23C 2265/16* (2013.01); *G05B 2219/45145* (2013.01); *G05B 2219/49149* (2013.01); *Y02P 90/265* (2015.11)

(56) References Cited

U.S. PATENT DOCUMENTS

| | | |
|---|---|---|
| 2001/0048857 A1 | 12/2001 | Koch |
| 2006/0291969 A1 | 12/2006 | Koch |
| 2008/0050184 A1 | 2/2008 | Glaesser |
| 2011/0188959 A1* | 8/2011 | Brambs .................... B23C 3/00 409/132 |

FOREIGN PATENT DOCUMENTS

| | | |
|---|---|---|
| DE | 102012016676 A1 | 2/2014 |
| EP | 0316807 A1 | 5/1989 |
| JP | 08252713 A | 10/1996 |
| JP | 2007229849 A | 9/2007 |
| JP | 2011183528 A | 9/2011 |
| JP | 2011251401 A | 12/2011 |
| WO | 0178943 A2 | 10/2001 |
| WO | 2004070483 A1 | 8/2004 |
| WO | 2004104715 A1 | 12/2004 |

\* cited by examiner

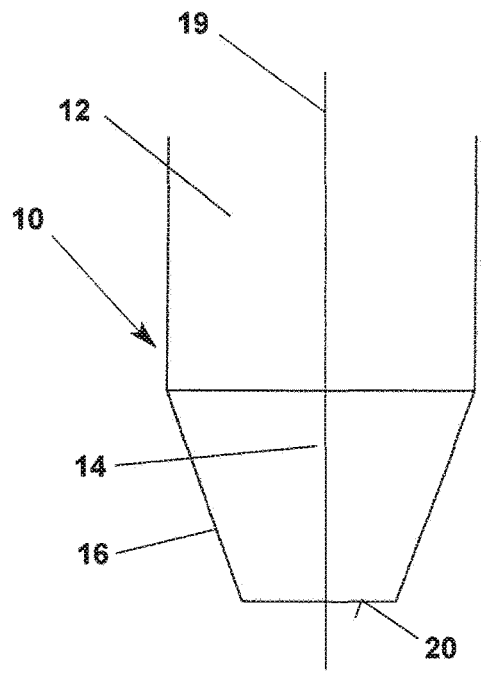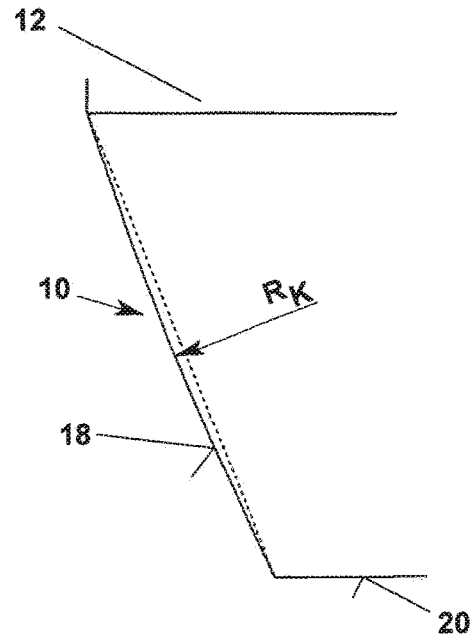
Fig. 1a  Fig. 1b
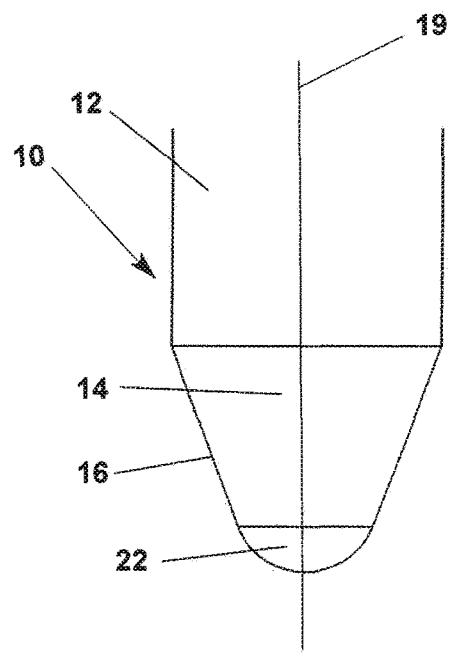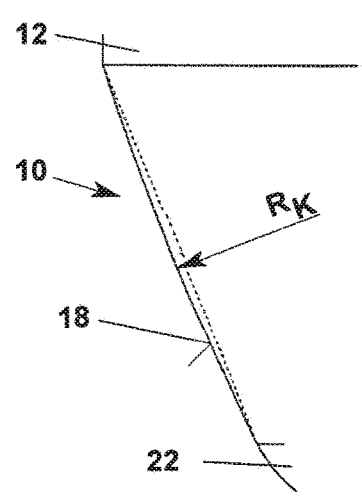
Fig. 2a  Fig. 2b

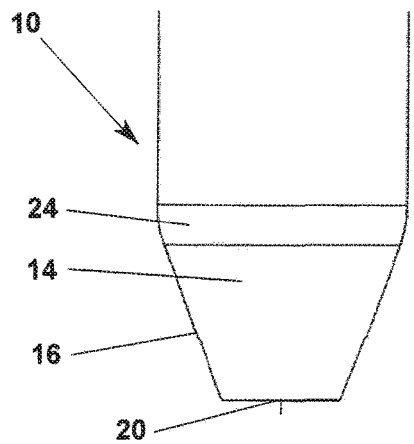
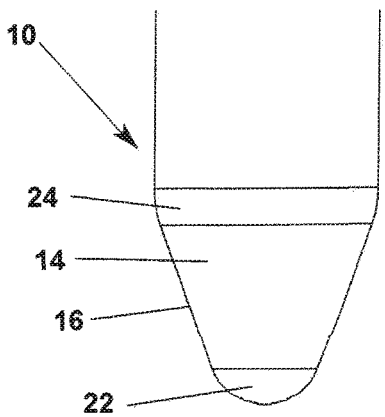
Fig. 3a    Fig. 3b
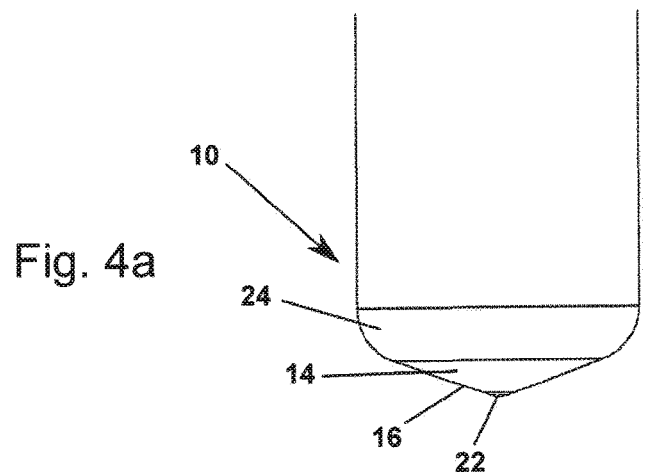
Fig. 4a
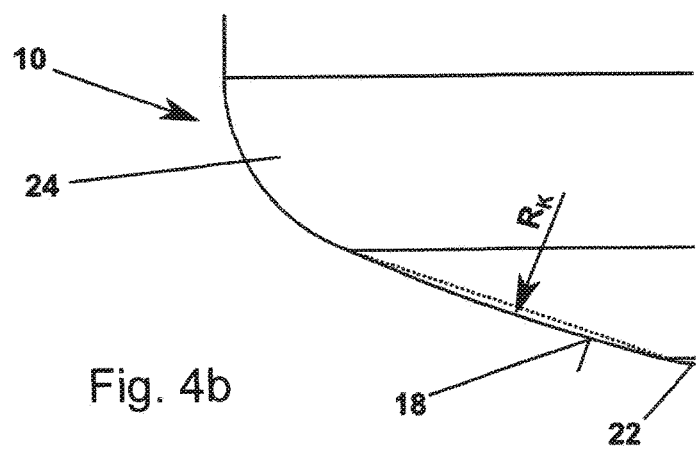
Fig. 4b

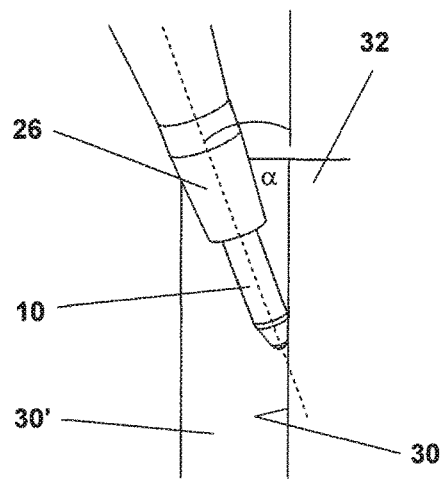
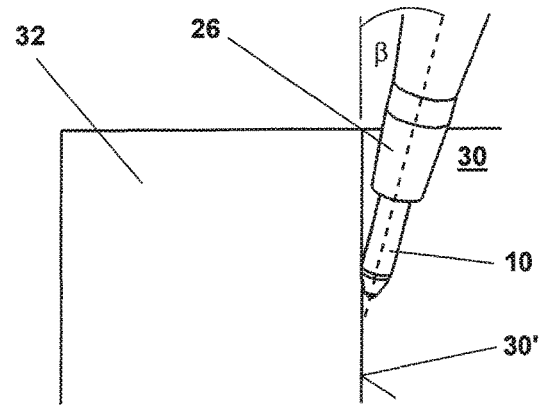
Fig. 13b
Fig. 13c
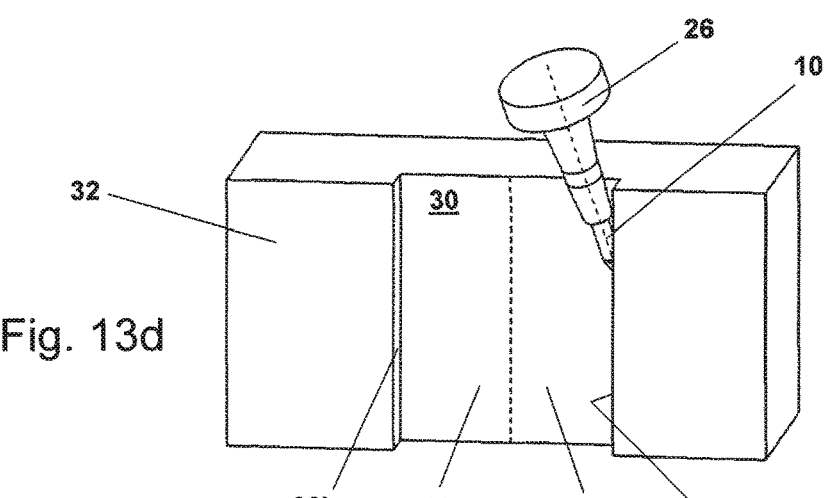
Fig. 13d
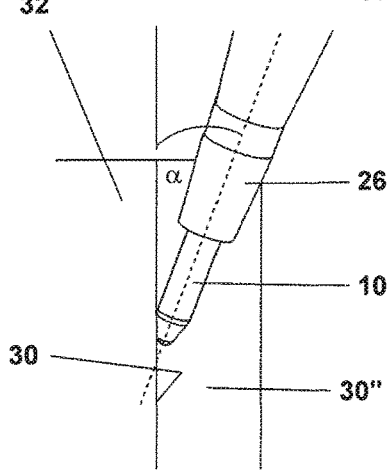
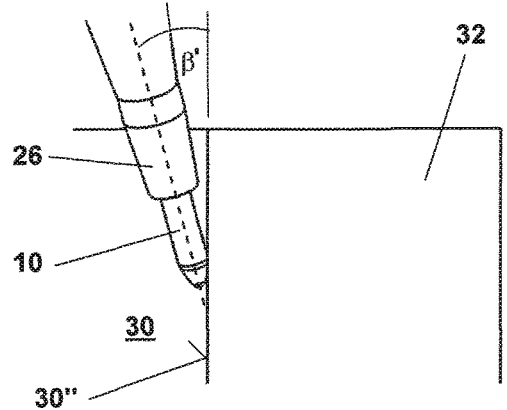
Fig. 13e
Fig. 13f

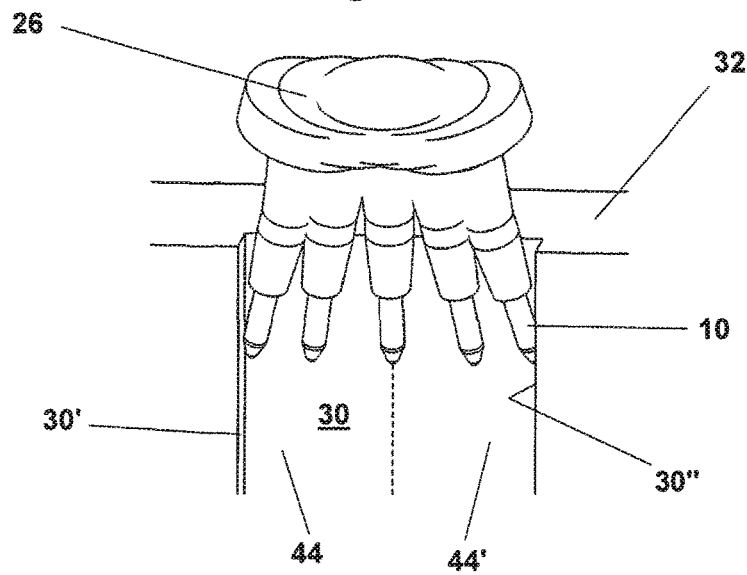
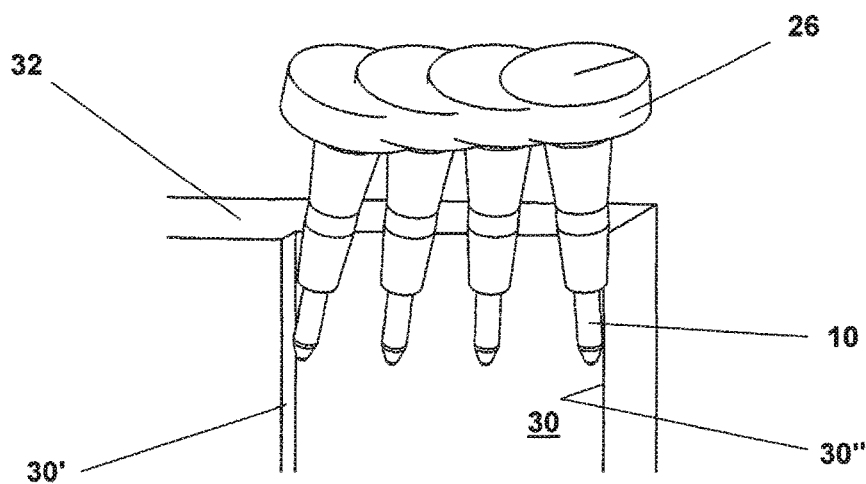

METHOD FOR MACHINING FLAT SURFACES OF A WORKPIECE

CROSS REFERENCE TO RELATED APPLICATIONS

This application is the US national stage of PCT/EP2016/000527 filed on Mar. 29, 2016, which claims the priority of DE 102015104679.2 filed on 2015 Mar. 26; these applications are incorporated by reference herein in their entirety.

BACKGROUND

The invention relates to methods for machining flat surfaces of a workpiece using a tool, in particular a milling tool.

In spite of the simple geometry of flat surfaces, there are many different machining strategies that differ, among others, in terms of the tools used, the technical requirements, the production duration and the surface quality that can be achieved. Such flat surfaces or planes are specifically found in many parts in tool and mould construction.

For instance, face milling is often used to machine flat surfaces. A cylindrical end or radius mill, an end mill with rounded tip, is moved with the front face over the plane for this. For example, work is conducted in parallel to the contour or in lines, with consistent or alternating directions. In the area of pocket processing, as described for example in US 2013/0151000 A1 or U.S. Pat. No. 8,489,224 B2, in which a plane at the bottom defines the essential geometry, more complex path shapes such as spirals and trochoids are used as well. The tool in face milling is essentially vertical on the plane, but may be slightly inclined in the infeed direction and/or laterally to it to adjust the cutting conditions. Even though face milling has proven its worth in machining freely accessible and/or "free-standing" planes in practice, face milling has some inherent disadvantages. On the one hand, machining of planes the machining of which is impaired by adjacent surfaces is possible only with great limitations or even entirely excluded. For example, when a collision of the tool holder with a surface adjacent to the plane to be machined threatens, the extension length, i.e. the length by which the tool protrudes from the holder, would have to be increased, which impairs stability at maintenance of the tool diameter. Machining of a pocket, for example, comprising three or more adjacent flat side walls and a floor surface, by face milling is impossible, since the tool with holder and possibly further components such as the spindle, etc., will usually not fit inside the pocket. On the other hand, the tool must be pivoted by 90° when machining lateral planes of a workpiece. With a large workpiece, there often will not be enough space left in the working space of the machine to position the pivoted tool with the holder and the further components. Personnel-, time- and therefore cost-intensive re-clamping of the workpiece is the consequence of this.

As an alternative, punching is used for machining flat surfaces. In this, an end mill is usually moved in several passes along its axis vertically from the top down over the plane to be machined, whereby the tool may also be moved at a specific application angle to the plane. However, also punching has considerable disadvantages in practice. If the tool is long enough and vertical accessibility is ensured, even planes that are hard to reach in face milling can be machined. However, a tool of such length is often subject to high dislocation and the risk of unstable machining in general. If, however, a sufficiently long tool cannot be used for the plane, for example because vertical accessibility is missing, a collision of the holder cannot be avoided and complete machining is impossible. Punching also requires a very large number of vertical passes in order to achieve a certain surface accuracy, in particular since the diameter of the tool must not be too large to permit machining of corners as well.

There also is the option of swarf milling, which is mostly used for machining planes and free-form surfaces, as may be taken for example from U.S. Pat. No. 5,391,024 A and US 2015/0032250 A1. A cylindrical end mill is aligned in parallel with the plane or free-form surface to be machined for this, brought into contact with it and moved orthogonally to its axis. Thus, the flank of the tool is used predominantly. Swarf milling permits larger step widths than face milling or punching due to the resulting larger reach area. However, the swarf milling has also turned out to have comparatively high disadvantages in practice for machining planes due to the collision and stability problems. Due to the alignment of the tool in parallel with the plane, the extension length must at least correspond to the height of the plane in order to completely machine it without collision. A large extension length, however, considerably reduces stability of the tool and thus the milling quality. To improve stability, the cylindrical end mill has been replaced by a conical mill with or without spherical front face. In order to bring the tool into contact with the plane, it must be angled. The conical shape of the tool, in connection with its inclination, leads to a lower displacement, since part of the cutting forces can be discharged in the direction of the tool axis. The reduced displacement permits larger extensions. But the inclined tool holder is usually not far enough from the plane due to the usually small cone angle in order to avoid collision. If the surfaces adjacent to the plane are located detrimentally, it may be impossible to put the tool into contact with the plane without causing a collision between the holder and the adjacent surfaces. Abrupt transfers between the conical blade and the shaft or the flat or spherical front face are particularly detrimental as well. The transfers can specifically lead to undesired strip-like traces at the workpiece when the blade is completely supported, in particular if the pivot axes of the milling machine used do not work precisely enough.

Multipass milling is known as another strategy for plane machining. The tool is placed vertically or at a specific angle to the flat surface and is moved back and forth. A ball mill is used most frequently for this. Such multipass machining of flat surfaces is described for example in JP 2011-251401 A, with the ball mill being moved with a lead angle for an alternating infeed direction to improve the cutting conditions (synchronous milling). It has turned out to be particularly disadvantageous in practice for multipass milling that the tool or its spherical front face must be narrow enough to machine even narrow sections. Furthermore, a comparatively small distance between the machining passes is necessary in order to permit a specified surface accuracy. Both lead to a large number of passes and make machining accordingly long. Multipass milling for machining flat surfaces therefore is often inefficient and thus not least comparatively costly.

To solve the collision problem, which occurs in many machining strategies with different tools, JP 2011-183528 A further suggests a method where the tool is to be inclined against the surface to be machined in the respective positions of the tool path. A change to the contact point at the tool in this context is not considered and can lead to decisive disadvantages depending on the type of tool. Furthermore, it is not possible to specifically control tool application on one hand while taking measures to prevent collisions independently of this on the other hand. The tool inclination also serves exclusively to prevent collisions with the flat surface to be machined itself, but not with any adjacent surfaces.

As a result, these known milling methods have considerable disadvantages regarding the technical feasibility, the options for avoiding collision, the stability and the efficiency, as well as the cost effort connected to this.

SUMMARY

A method for machining of flat surfaces of a workpiece using a tool is presented here, in particular a milling tool, which is laterally inclined against a flat surface, guided with a contact point on the flat surface and moved in a collision-free manner. The flat surface is machined using a tool with a cutting contour, which has a conically convex design at one flank of the tool. To avoid a one-sided collision, the flat surface is completely machined by the tool with a pivot angle in parallel to the flat surface. To avoid a two-sided collision by the tool, there are at least two different pivot angles in parallel to the flat surface, wherein the flat surface is divided into at least two machining segments to avoid the two-sided collision and each of the at least two machining segments is assigned an individual pivot angle of the tool to avoid collision.

DETAILED DESCRIPTION

The present invention now has the object of providing a method for machining flat surfaces of a workpiece using a tool, in particular a milling tool, with which the above disadvantages can be prevented, which specifically permits particularly simple, quick and practical, efficient as well as collision-free machining of flat surfaces and/or planes, can reach workpieces with an extremely high surface quality and, connected to this, leads to a considerable reduction of operating and production costs as a whole.

This object is achieved in a surprisingly simple manner by the features described below.

The design of the method according to the invention for the machining of flat surfaces of a workpiece using a tool, in particular a milling tool, which is laterally inclined against a flat surface, guided with a contact point on the flat surface and moved collision-free, with the flat surface being machined using a tool with a cutting contour, which has a conically convex design, at one flank of the tool, and to avoid a one-sided collision completely machined by the tool with a pivot angle in parallel to the flat surface and/or to avoid a two-sided collision of the tool with at least two different pivot angles in parallel to the flat surface, with the flat surface divided into at least two machining segments to avoid the two-sided collision and each of the at least two machining segments being assigned an individual pivot angle of the tool to avoid collision, allows for an especially simple, quick as well as practical, efficient and collision-free machining of flat surfaces and/or planes. One essential advantage of the method according to the invention is the option of machining even particularly difficult to access flat surfaces and/or planes without collisions and without having to deal with the increased machining time of known methods. At the same time, flat surfaces and/or planes of the workpieces with an extremely high surface quality can be achieved. Finally, the method according to the invention contributes to a considerable reduction of operating and production costs and thus to the total costs of machining of flat surfaces and/or planes.

The tool is of most particular relevance for the method according to the invention, in particular the milling tool, with a cutting contour, which is conical convex designed, at one flank of the tool, which is guided on the flat surface and/or plane with a contact point. One essential advantage of the method according to the invention that results from the cutting contour, which has a conically convex design and/or conical convex design, is based on the very large overlap of the tool, which results from appropriate application to the flat surface and/or plane to be machined. This not least leads to the method according to the invention to achieve a much larger step width as compared to all conventional methods whilst achieving the same surface quality. This in turn gains time of up to 90% and therefore considerably reduces the costs in total as compared to any of these conventional methods. Additionally, the method according to the invention has the advantage that the end points of the cutting contour at a flank of the tool according to the invention have a certain distance from the surface of the workpiece when applying the cutting contour, which has a conically convex design, to the flat conical shape at/on the flat surface and/or plane and thus do not leave any tracks. The tolerance the method according to the invention can achieve for angle offsets of the machine is of further particular advantage. If, for example, a specified application of the tool cannot be set precisely due to inaccuracies of the pivot axes of the machine, the conically convex or slightly bulging convex cutting contour at a flank of the tool according to the invention can compensate angle inaccuracies of the machine. Thus, the cutting contour at the flank of the tool remains almost unchanged interlocking with the workpiece and produces a homogeneous milling pattern. As compared to this, angle inaccuracies on a flat conical cutting contour at the flank of the tool would prevent the cutting contour from being precisely applied, and therefore lead to an uneven cut and, at multipass machining, produce undesired step effects on the surface of the workpiece.

Further particularly advantageous details of the method according to the invention are described with regard to other design variants.

According to the features of a further variant, the tool is preferably laterally inclined against the flat surface in such a way that the contact point of the cutting contour, which has a conically convex design, at the flank of the tool is applied to the flat surface in an upper area facing the shaft of the tool.

Additionally, it is within the scope of the invention that the tool in another design variant is moved in multiple passes from bottom up across the flat surface and is laterally inclined against the flat surface in such a way that the contact point of the cutting contour, which has a conically convex design, at the flank of the tool on the flat surface is in an area between the middle of the cutting contour and an upper area facing the shaft of the tool.

Furthermore, the invention intends that, as a further variation, the tool is moved in multiple passes from top down across the flat surface and is laterally inclined against the flat surface in such a way that the contact point of the cutting contour, which has a conically convex design, at the flank of the tool on the flat surface is in an area between the middle of the cutting contour and a lower area facing the front face and/or front side and/or front of the tool.

Furthermore, other features are of benefit, according to which the tool is laterally inclined against the flat surface in such a way that the contact point of the cutting contour, which has a conically convex design, at the flank of the tool on the flat surface is in a lower area facing the front face and/or front side and/or front of the tool.

Preferably, the lateral inclination of the tool against the flat surface is maintained unchanged throughout machining.

According to the measures of another variation, it is within the scope of the invention that collision freedom and possible one-sided and/or two-sided collisions are tested with the geometry of the workpiece.

Preferably, the tool path/s of the tool is/are calculated for the flat surface and/or the at least two machining segments according to a further design variant.

The measures of another variation are of very special interest, according to which the tool is moved in multiple passes across the flat surface or the at least two machining segments of the flat surface.

In this context, it is within the scope of the invention that the tool in another variant is moved in horizontal and/or diagonal passes across the flat surface or the at least two machining segments of the flat surface.

The features of a further design variant are of special advantage, according to which the flat surface or the at least two machining segments of the flat surface is/are machined by the tool in multiple passes, with the pivot angle of the tool of the at least one machining segment being continuously interpolated with the pivot angle of the tool of the at least other machining segment, and vice versa.

Preferably, the flat surface or the at least two machining segments of the flat surface is/are machined using a tool that has a cutting contour, which has a conically convex design, at the flank of the tool formed by a conical contour with a conical angle between the conical contour and the axis of the tool and a convex bulge going out from the conical contour.

Additionally, the flat surface or the at least two machining segments of the flat surface can be machined in a beneficial manner using a tool, with its cutting contour, which has a conically convex design, at the flank of the tool being formed as a circular segment or ellipsoid segment with a large curve radius, in particular ≥250 mm, preferably ≥500 mm.

According to another design variant, the flat surface or the at least two machining segments of the flat surface is/are machined using a tool, with its cutting contour, which has a conically convex design, at the flank of the tool being formed as a circular segment, ellipsoid segment or curve segment with a constant or varying curve radius $R_K$.

Furthermore, the invention intends very beneficially that the flat surface or the at least two machining segments of the flat surface in another variation is/are machined using a tool the cutting contour, which has a conically convex design, of which is formed symmetrically or asymmetrically at the flank of the tool.

Preferably, the flat surface or the at least two machining segments of the flat surface is/are machined using a tool, with its cutting contour, which has a conically convex design, at the flank of the tool transferring directly to the shaft at the flank of the tool.

According to the invention, it is also intended that the flat surface or the at least two machining segments of the flat surface can be machined using a tool, with its cutting contour, which has a conically convex design, at the flank of the tool transferring indirectly to the shaft of the tool via a rounded transfer. This rounded transfer or the rounding further increases the already-mentioned advantage of the method according to the invention, according to which the end points of the cutting contour of the tool have a certain distance from the surface of the workpiece at application of the cutting contour, which has a conically convex design, at/on the flat surface and/or plane and thus leave no traces on the machined workpiece. Additionally, the rounded transfer facilitates machining of difficult to access areas between adjacent (flat) surfaces in many cases.

Finally, it is in the scope of the invention that the flat surface or the at least two machining segments of the flat surface according in a further variant is/are machined using a tool, with its cutting contour, which has a conically convex design, at the flank of the tool transferring to a flat front face and/or front side and/or front of the tool.

Alternatively, the flat surface or the at least two machining segments of the flat surface finally can also be machined using a tool, with its cutting contour, which has a conically convex design, at the flank of the tool transferring to a spherical front face and/or front side and/or front of the tool.

BRIEF DESCRIPTION OF THE DRAWINGS

Further features, advantages and details of the invention can be gathered from the following description of some preferred embodiments of the invention and are based on the drawings. The drawings are as follows:

FIGS. 1a and 1b a schematic, partially broken-off side view of an embodiment of a tool according to the invention and a schematic, partially broken off side view of the embodiment of the tool according to the invention according to FIG. 1a, enlarged in size, FIGS. 2a and 2b schematic, partially broken-off side views of another embodiment of a tool according to FIGS. 1a and 1b, FIGS. 3a and 3b schematic, partially broken off side views of another embodiment of a tool according to the invention according to FIGS. 1a and 2a, FIGS. 4a and 4b schematic, partially broken off side views of yet another embodiment of a tool according to the invention according to FIGS. 1a and 2a, FIGS. 5a to 5c a schematic perspective view, a front and a side view, each partially broken off, of a workpiece and of a tool designed according to the invention to explain a first step of the method according to the invention, FIGS. 6a to 6d schematic, partially broken off side views of the workpiece and of the tool according to the invention according to FIG. 5c, enlarged in size, FIG. 7 a schematic perspective, partially broken off view of a workpiece with various flat surfaces and/or planes, FIGS. 8a to 8c schematic, partially broken off side views of the workpiece according to FIG. 7 together with a tool according to the invention with different lateral inclination, FIGS. 9a to 9c schematic perspective, partially broken off views and a side view of an embodiment of a workpiece with a tool according to the invention to explain a second step of the method according to the invention, FIGS. 10a to 10g schematic perspective, partially broken off views and a side view of another embodiment of a workpiece with a tool according to the invention according to FIGS. 9a to 9c, at different depth settings of the tool, FIGS. 11a to 11g schematic perspective, partially broken off views and a side view of another embodiment of a workpiece with a tool according to the invention according to FIGS. 9a to 9c, at different depth settings of the tool, FIGS. 12a to 12g schematic perspective, partially broken off views and side views of the embodiment of the workpiece with the tool according to the invention according to FIGS. 9a to 11g to explain a third step of the method according to the invention, FIGS. 13a to 13f schematic perspective, partially broken off views and side views of the embodiment of the workpiece with the tool according to the invention according to FIGS. 11a to 11g to explain the third step of the method according to the invention, FIGS. 14a to 14g schematic perspective, partially broken off views of the embodiment of the workpiece with the tool according to the invention according to FIGS. 13a to 13f to explain a changed third step of the method according to the invention, FIGS. 15a and 15b schematic perspective, partially broken off views of the embodiment of the workpiece with the tool according to the invention according to FIGS. 13a to 13f to explain an even further changed third step of the method according to the invention, and FIGS. 16a to 16f schematic perspective, partially broken off views of the preceding embodiments of the workpiece with the tool according to the invention to explain a fourth step of the method according to the invention, and FIGS. 17a and 17b a schematic perspective view of a workpiece with a pocket with a flat bottom surface, and a schematic, partially broken off side view of a workpiece with a pocket with a flat bottom surface according to FIG. 17a, together with a tool according to the invention according to FIGS. 4a and 4b.

DETAILED DESCRIPTION OF THE PREFERRED EMBODIMENTS

Figure 5B:
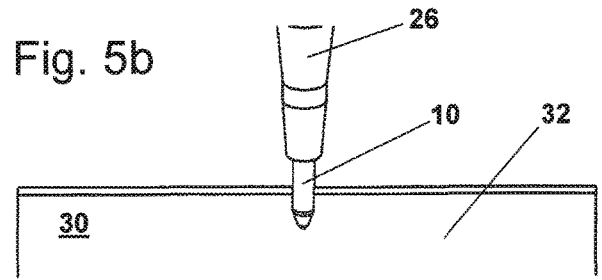

In the following description of different embodiments of a tool 10 formed according to the invention and of a method according to the invention for machining using a tool 10, similar parts that correspond to each other are assigned identical reference numbers. The tool 10 for example can be designed without limitation of the invention as a milling tool and/or milling cutter.

In the embodiment of a tool 10 intended for the method according to the invention as shown in FIGS. 1a and 1b, in particular of a milling tool, the tool 10 comprises a shaft 12 and a blade 14 adjacent to the shaft 12. The blade 14 is arranged at a flank 16 of the tool 10 and is provided with a cutting contour 18, which has a conically convex design.

The phrase "tool with a cutting contour, which has a conically convex design and/or conical convex design" used above and below means a tool 10 with a shape that is formed by a conical angle, i.e. the angle between the tool axis 19 of the tool 10 according to the vertical line in FIGS. 1b and 2b and to the conical contour according to the dashed line in FIGS. 1b and 2b, and a convex bulge of this contour having a curve radius $R_K$.

Accordingly, the tool 10 has a cutting contour 18 of almost conical shape that does not run (linearly) conical, but bulges slightly in a slightly convex shape. This way, the surface quality at the flat surface of a workpiece can be significantly improved in particular based on the tolerance of the tool 10 regarding machine inaccuracies. At the same time, however, advantages of a purely conically shaped tool, such as a large step width (all the larger in the invention the larger the curve radius $R_K$) or a beneficial collision-avoiding property of a purely conical cutting contour, through which the tool shaft and the tool holder are inclined far away from the plane at application, can be used.

The flat surface 30 or the at least two machining segments 44, 44', 44" of the flat surface 30 is/are machined using a tool 10 that has a cutting contour 18, which has a conically convex design, at the flank 16 of the tool 10 formed by a conical contour with a conical angle between the conical contour and the axis of the tool 10 and a convex bulge going out from the conical contour.

A cutting contour 18, which has a conically convex design, at the flank 16 of the tool 10 that is designed as a circle segment or ellipsoid segment with a large curve radius $R_K$, in particular $R_K \geq 250$ mm, most preferably $\geq 500$ mm, has turned out to be of special advantage.

Furthermore, the cutting contour 18, which has a conically convex design, at the flank 16 of the tool 10 can be designed in a beneficial manner as a circle segment, ellipsoid segment or curve segment with a constant or varying curve radius $R_K$.

In the present embodiment according to FIGS. 1a and 1b, the cutting contour 18, which has a conically convex design, at the flank 16 of the tool 10 is designed symmetrically, i.e. formed in such a way that the deviation from the flat course is the largest at the center. Without being shown in detail, the cutting contour 18, which has a conically convex design, can, however, be designed equally asymmetrically.

As shown in FIGS. 1a and 1b, the cutting contour 18, which has a conically convex design, at the flank 16 of the tool 10 is arranged directly adjacent to the shaft 12 of the tool 10.

The cutting contour 18, which has a conically convex design, also transfers to a flat front face 20 and/or front side and/or front of the tool 10, virtually merging into it.

The embodiment of the tool 10 intended for the method according to the invention, which is shown in FIGS. 2a and 2b, differs from that in FIGS. 1a and 1b only in that the tool 10 is equipped with an additional spherical front face 22 and/or front side and/or front instead of a flat front face 20. Thus, the cutting contour 18, which has a conically convex design, turns into a spherical front face 22 and/or front side and/or front of the tool 10.

In FIGS. 3a and 3b, yet another embodiment of the tool 10 intended for the method according to the invention is presented, in which the cutting contour 18, which has a conically convex design, at the flank 16 of the tool 10 is arranged indirectly adjacent to the shaft 12 of the tool 10. An additional, rounded transfer 24 between the shaft 12 and the flank 16 of the tool 10 is intended for this.

Additionally, FIGS. 4a and 4b show another exemplary embodiment of a tool 10, which is suitable in particular for the machining of essentially horizontal flat surfaces 30, such as bottom surfaces of pockets. The cutting contour 18, which has a conically convex design, at the flank 16 of the tool 10 runs with a steeper alignment here (the conical angle of the underlying conical contour is larger). In the embodiment of FIGS. 4a and 4b, the tool 10 is equipped with a spherical front face 22 and/or front side and/or front pursuant to FIGS. 2a and 2b and with an additional, rounded transfer 24 between the shaft 12 and the flank 16 pursuant to FIGS. 3a and 3b. Without being illustrated in detail, embodiments without these additional form elements or in other designs are also possible without any issues.

Figure 5A:
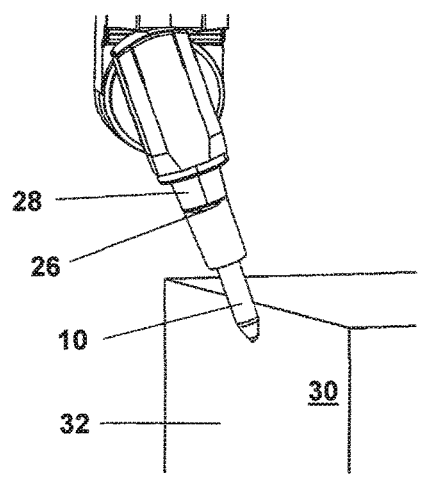

When used at the machine, the tool 10, as shown schematically in FIG. 5a, is fastened via the shaft 12 in a holder 26, which in turn is connected to the machine spindle 28. The holder geometry depends on type. The extension length, i.e. the length by which the tool 10 protrudes from the holder 26, is variable.

The method according to the invention is suitable very beneficially for machining flat surfaces 30 and/or planes of a workpiece 32 using the tool 12 in the form of, in particular, a milling tool. The blade 14 of the tool 10 has a conically convex designed shape that is used to achieve an efficient and collision-free 5-axis processing of the flat surfaces.

The method according to the invention is made up of the following individual process steps, which are explained in more detail purely by way of example based on the particularly exemplary design of the tool 10 according to the invention with a spherical front face 22 and a rounded transfer 24, without being limited to these:

In a first step, the lateral inclination of the tool 10 to the flat surface 30 and/or plane, i.e. the inclination away from the flat surface 30, is determined according to FIGS. 5a to 8c. The target of this is to apply and to adapt, respectively, the cutting contour 18, which has a conically convex design, to the flat surface 30 and/or plane in a suitable manner.

Figure 5C:
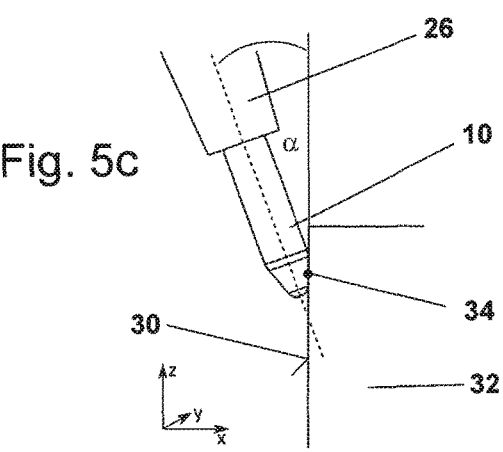

As FIGS. 5a to 5c show schematically, the lateral inclination α against the vertical and/or, in the present example of an embodiment, against the vertically running flat surface 30 and/or plane, is set in such a way that the cutting contour 18 of the tool 10 touches the plane in a contact point 34.

The conically convex shape 18 of the blade 14 specifies the inclination angle α to a relatively small interval. Any inclination angle α within this interval can be chosen and determines the precise position of the contact point 34 at the tool 10.

Figure 6A:
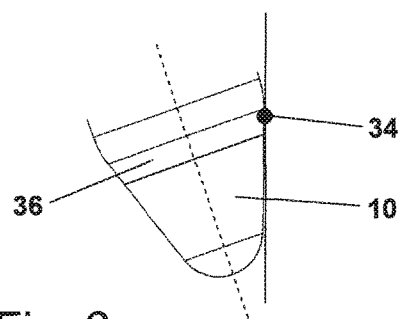

Beneficial contact points 34 are presented by selection of the corresponding inclination angles α in FIGS. 6a to 6d:

In FIG. 6a, the contact point 34 of the cutting contour 18, which has a conically convex design, is located at the flank 16 of the tool 10 on the flat surface 30 in an upper area 36 facing the shaft 12 of the tool 10. In the example of embodiment of FIG. 6a, the contact point 34 is directly adjacent to the rounded transfer 24.

Figure 6B:
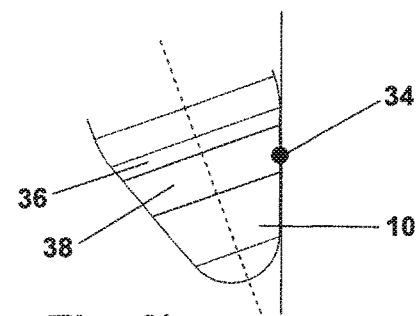

In FIG. 6b, the contact point 34 of the cutting contour 18, which has a conically convex design, on the flat surface 30 is in an area 38 between the center of the cutting contour 18 and an upper area 36, facing the shaft 12 of the tool 10 and/or adjacent to it.

Figure 6C:
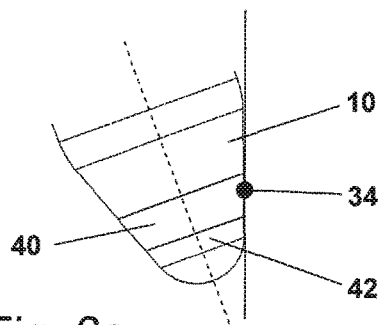

In FIG. 6c, the contact point 34 of the cutting contour 18, which has a conically convex design, on the flat surface 30 is arranged in an area 40 between the center of the cutting contour 18 and a lower area 42, facing the front face 22 and/or front side and/or front of the tool 10 and/or placed adjacent to it.

Figure 6D:
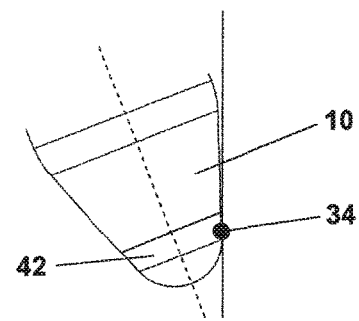

In FIG. 6d, finally, the contact point 34 of the cutting contour 18, which has a conically convex design, on the flat surface 30 is arranged in a lower area 42, facing the front face 22 and/or front side and/or front of the tool 10. In the example of embodiment of FIG. 6d, the contact point 34 is directly adjacent to the front face 22 and/or front side and/or front of the tool 10.

The selection and determination of the inclination angle α and therefore of the contact point 34 can be used in beneficial but nevertheless different manners in many situations.

In order to bring out transfer areas between flat surfaces 30 and/or planes more precisely, it is of benefit to choose the contact point 34, as shown in FIG. 6a, for machining, with the angle between the two adjacent surfaces being very large.

In multipass machining of a flat surface 30 and/or plane from bottom up, in turn, a contact point 34 in or above the center, as shown in FIG. 6b, is preferred, since an optimal overlap of subsequent passes is ensured and the upper end of the flat surface 30 can be machined better.

Vice versa, a contact point 34 in or below the center, as shown in FIG. 6c, is of benefit in multipass machining from top down, since, on one hand, an optimal overlap of subsequent passes is ensured this way (a contact point 34, the distance of which from the lower end of the cutting contour 18 is equal to the distance between the passes, is of particular benefit here) and, on the other hand, the lower end of the flat surface 30 can be better reached. This is in particular the case when a bottom surface (not illustrated) is adjacent.

In order to bring out transfer areas between flat surfaces 30 and/or planes more precisely, it may be of benefit to choose the contact point 34, as shown in FIG. 6d, for machining, with the angle between the two adjacent surfaces being rather small.

Figure 7:
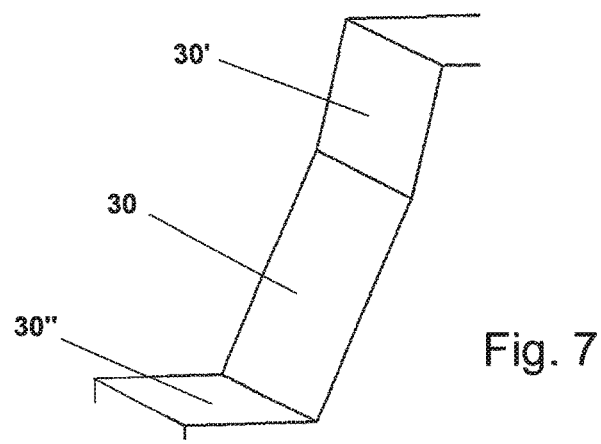

FIG. 7 shows an example of a flat surface 30 and/or plane for which machining is made more difficult by two other flat surfaces 30', 30", adjacent to it on the top and bottom.

Figure 8A:
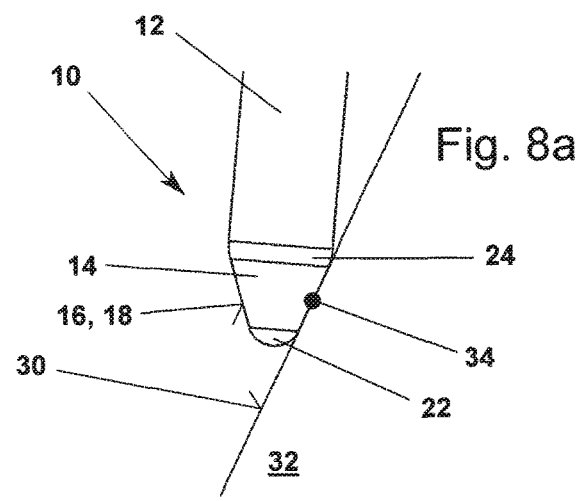

The flat surface 30 is machined, as shown in FIG. 8a, with a contact point 34 in the middle area 38 or 40 of the blade 14 according to FIG. 6b or 6c, which is optimal for the surface accuracy.

Figure 8B:
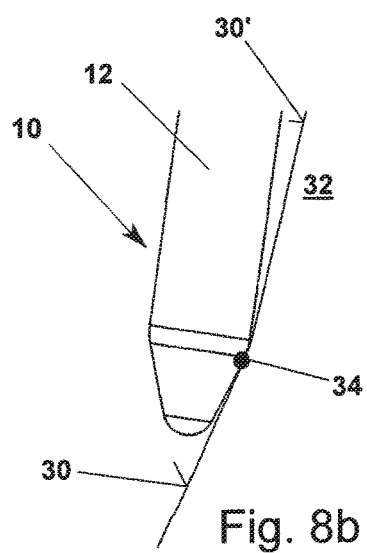

The transfer area between the flat surface 30 and the flat surface 30' above, as shown in FIG. 8b, can be achieved even better with a contact point 34 in the upper area 36 of the blade 14 according to FIG. 6a. Thus, the additional rounded transfer 24 to the shaft 12 can be used beneficially as well.

Figure 8C:
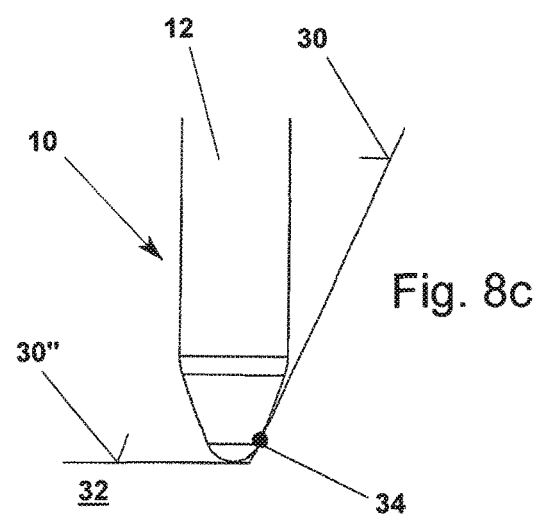

For the transfer area between the flat surface 30 and the flat surface 30" below and/or bottom surface, as shown in FIG. 8c, in turn, a contact point 34 in the lower area 42 of the blade 14 according to FIG. 6d is suitable. Thus, the tool 10 can enter more deeply than when maintaining a contact point 34, which is located in an area 38 or 40 precisely or closely to, i.e. slightly above or below, the center of the blade 14. Additionally this also permits beneficial interlocking of the additional spherical front face 22, in order to work out the corner.

The application or adaption of the blade 14 to a flat surface 30 and/or plane requires only a relatively small inclination angle α. Machining of the lateral flat surface 30 of the workpiece 32 is possible without any problems. In particular vertical flat surfaces 30 and/or planes (also within pockets) are thus accessible very easily, with only slight stress on the pivot axes. This is another benefit of the method according to the invention and the tool 10 as compared to conventional methods, in which the tool must be turned by 90°, in order to be able to place it on such a flat surface 30. Thus, the problem of positioning the tool 10 in the limited work space of the machine at large workpieces 32 or parts can be mostly solved.

In a second step of the method according to the invention, possible collisions of the shaft 12 or of the holder 26, and/or, if applicable, also of the machine spindle 28 of the tool 10, with the surrounding geometry of the workpiece 32 according to FIGS. 9a to 11g are reviewed.

Based on the chosen lateral inclination α of the tool 10, it is therefore reviewed whether complete machining of the flat surface 30 is possible, i.e. whether the blade 14 of the tool 10 can be moved along the entire surface 30 and/or plane (pursuant to multipass machining, for example), without the shaft 12 or the holder 26 of the tool 10 or the machine spindle 28 colliding with the surrounding component geometry. Tool 10, holder 26 and workpiece 32 and/or part are preferably present in the form of CAD models, so that a collision test by common methods for cut calculation is possible.

In the following, various exemplary situations are described that occur during collision testing. The description remains limited to vertical, rectangular flat surfaces 30 and/or planes for simplification. Without being illustrated in detail, transfer to inclined and non-rectangular flat surfaces 30 and/or planes (trapezoidal or triangular or with curved contours, for example) is possible without any problems.

Figure 9A:
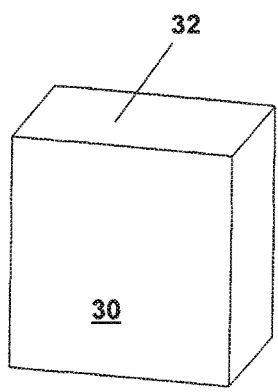
Figure 9B:
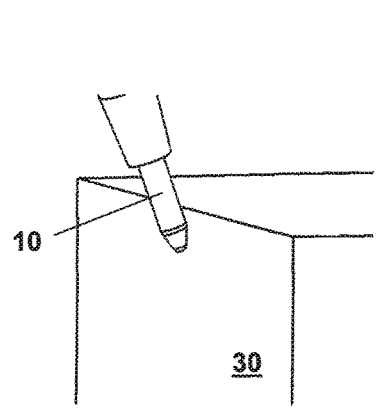
Figure 9C:
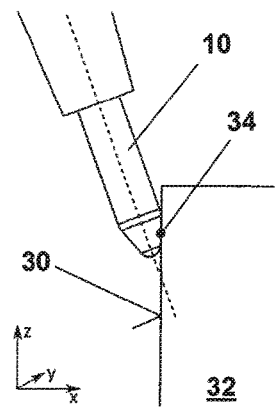
Figure 10A:
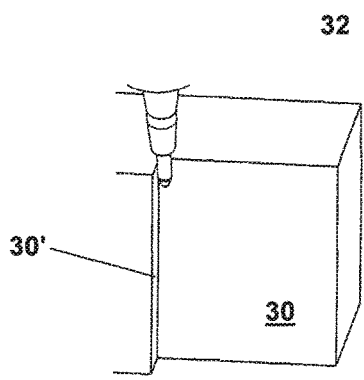
Figure 10B:
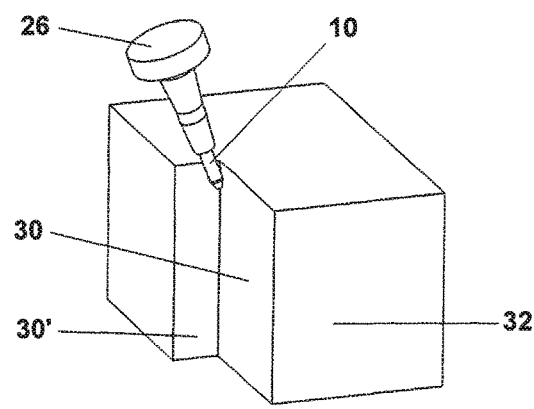
Figure 10C:
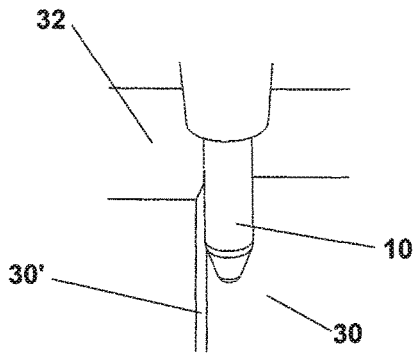
Figure 10D:
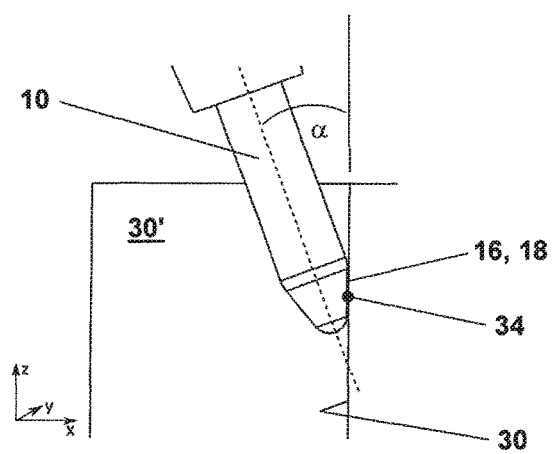
Figure 10E:
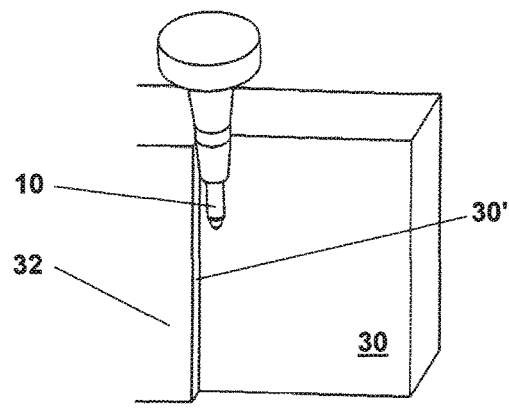
Figure 10F:
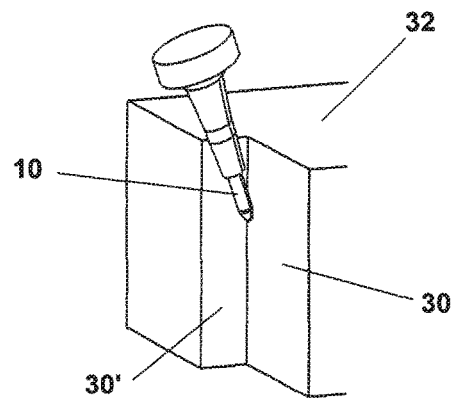
Figure 10G:
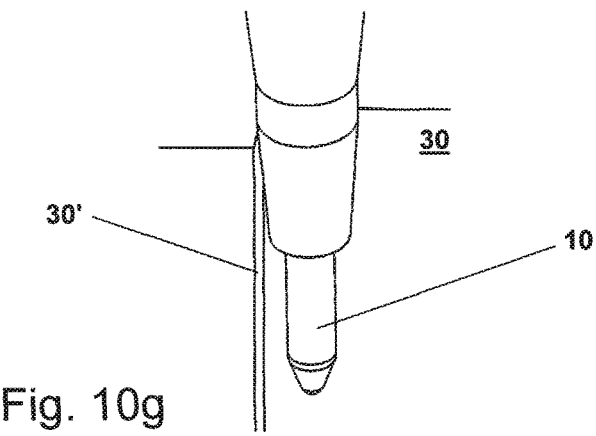

According to FIGS. 9a to 9c, machining of the flat surface 30 is not impaired by adjacent surfaces. No collisions occur.

According to FIGS. 10a to 10d, access to the flat surface 30 and/or plane is made difficult on one side by a surface 30' adjacent on the left.

From a certain depth onwards, the shaft 12 of the tool 10 first collides with the adjacent surface 30' according to FIGS. 10a to 10d in the example. As can be seen from FIGS. 10e to 10g, collisions between the holder 26 of the tool 10 with the adjacent surface 30' occur as well farther below.

According to FIGS. 11a to 11e, access to the flat surface 30 and/or plane is made difficult on two and/or both sides by adjacent surfaces 30', 30".

Figure 11A:
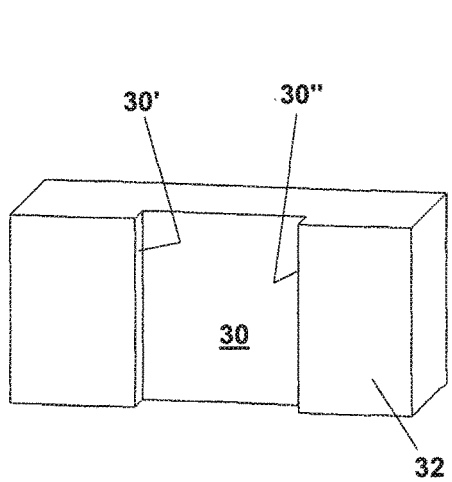
Figure 11B:
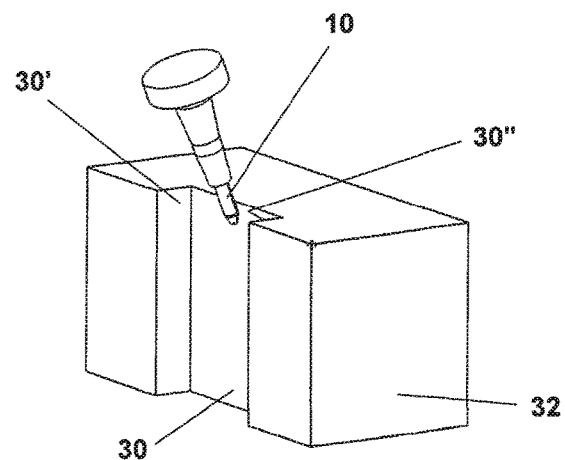
Figure 11C:
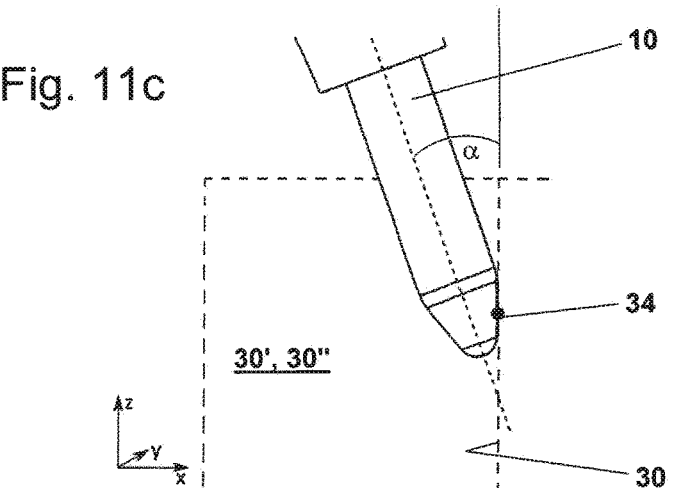
Figure 11D:
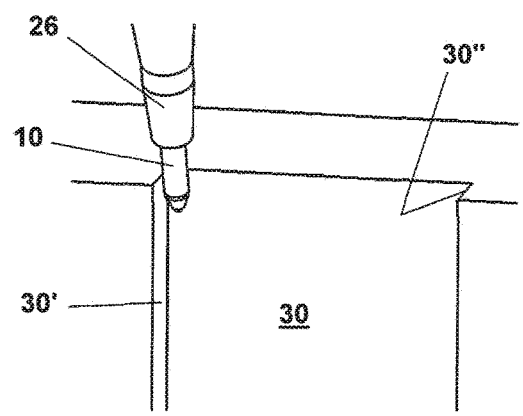
Figure 11E:
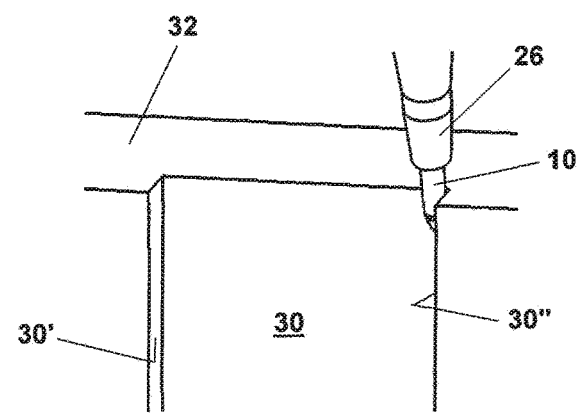
Figure 11F:
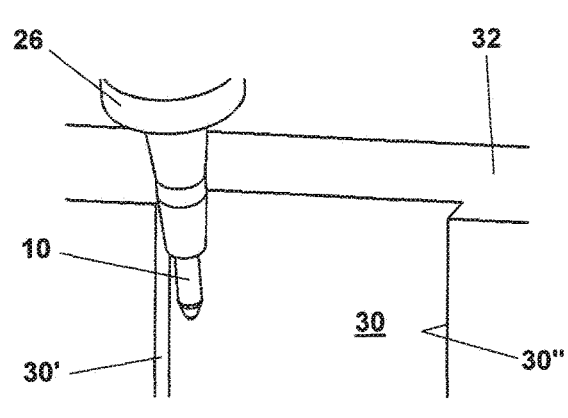
Figure 11G:
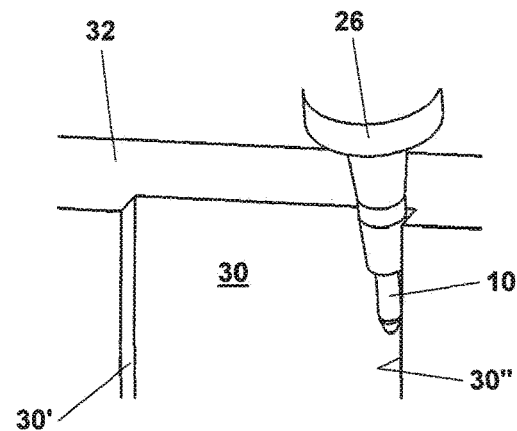

Accordingly, bilateral collisions initially occur between the shaft 12 of the tool 10 and the adjacent surfaces 30', 30" according to FIGS. 11d and 11e, and farther down also collisions between the holder 26 of the tool 10 and the adjacent surfaces 30', 30" according to FIGS. 11f and 11g.

It is not to be considered a limitation that the collision-causing surfaces 30', 30" are directly adjacent to the flat surface 30 to be machined in the illustrated cases of one-sided and two-sided collision. For example, the illustrated surfaces 30' and/or 30" could also be made up of multiple partial surfaces each, of which, if applicable, only partial surfaces that are not directly adjacent to the flat surface 30 would be affected by collisions. Equally, this also includes such cases where no collisions with directly adjacent surfaces 30', 30" occur, but with surfaces adjacent to these surfaces or even only indirectly adjacent in turn.

As FIGS. 10a to 10g and 11a to 11g clarify, the flat surface 30 and/or plane cannot be fully machined without collisions. The tool paths therefore would have to be shortened in the left and right corners, which would cause excess material to remain at the edges of the flat surface 30 and/or plane.

In a third step, the tool 10 is pivoted at an appropriate pivot angle β parallel to the flat surface 30 and/or plane if collisions are determined according to FIGS. 12a to 15b. The lateral inclination α determined in the first step is maintained across the entire flat surface 30 and/or plane, i.e. is and remains constant.

In order to avoid collisions as in the illustrated examples of embodiments pursuant to FIGS. 10a to 10g and/or 11a to 11g, the tool 10 is pivoted against the respective affected component geometry according to the method according to the invention around the pivot angle β parallel to the flat surface 10 and/or plane.

Referring to FIGS. 12a to 12e, the size of the pivot angle β is chosen so that no collisions with the shaft 12 and/or holder 26 can occur and/or that a certain pre-defined minimum distance from the affected component geometry is complied with. This is already sufficient for the situations shown in FIGS. 10a to 10g with unilateral limitation. FIGS. 12a to 12e show the tool 10 with the changed orientation of the tool 10 at the position of the former shaft collision.

Figure 12A:
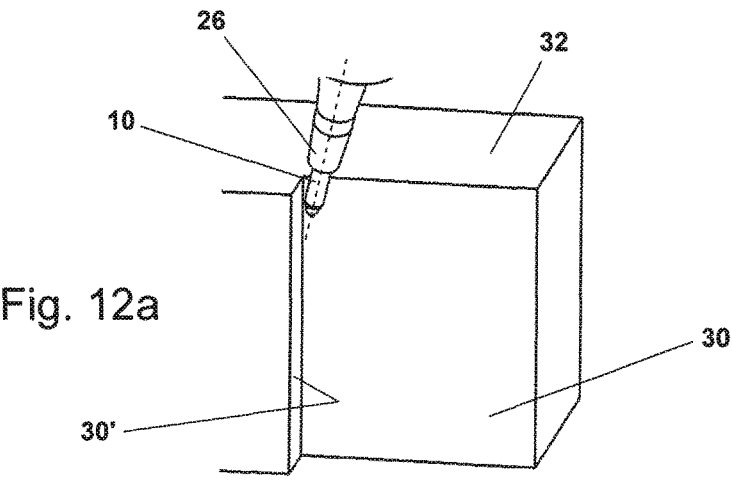
Figure 12B:
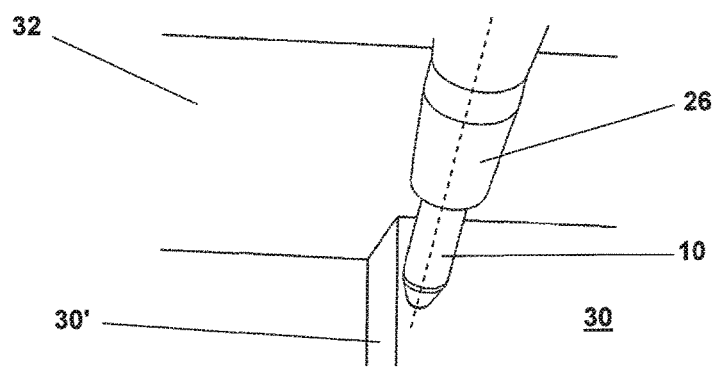
Figure 12C:
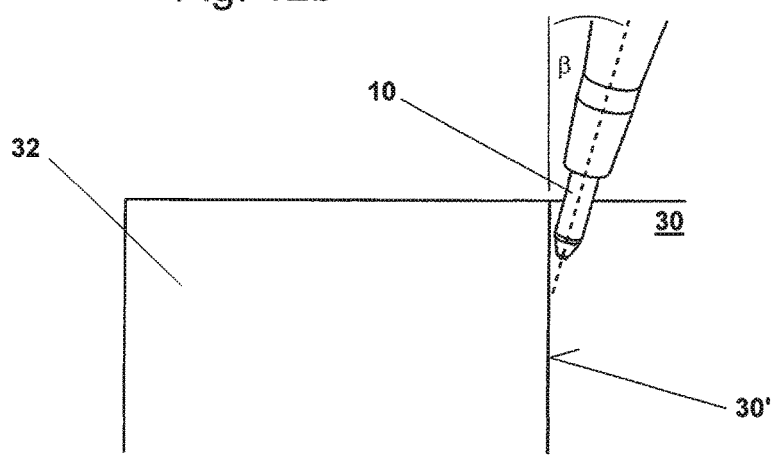
Figure 12D:
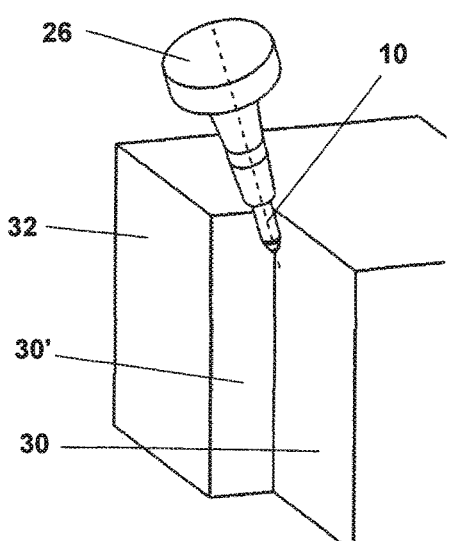
Figure 12E:
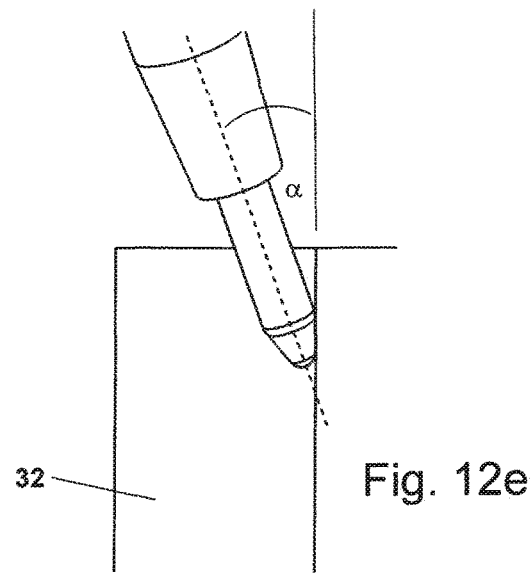
Figure 12F:
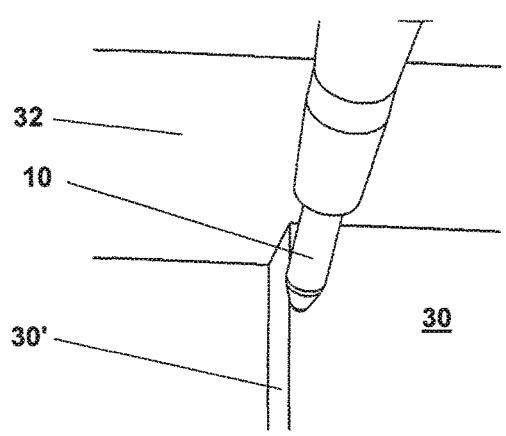
Figure 12G:
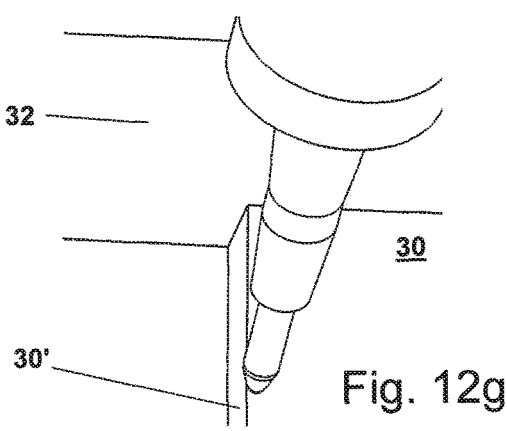

FIGS. 12f and 12g show the tool 10 with the changed orientation in the further course of machining. Now it can machine the flat surface 30 and/or plane nearly completely and far into the corner, without any shaft or holder collisions.

For the situations described based on FIGS. 11a to 11g with a two-sided or bilateral limitation, this procedure is, however, not yet sufficient. If a pivot angle β in parallel to the flat surface 30 is set on one (for example left) side in a bilaterally limited flat surface 30 to avoid collisions, this pivot angle β will impair machining in the area of the other (for example right) side, and vice versa. In the example of embodiment according to FIGS. 11a to 11g, a pivot angle β is determined for collision avoidance on the left, which pivots the tool 10 with holder 26 away from the left adjacent surface 30' and closer to the middle or the right side. The pivot angle β is not suitable for machining the right side, since this would cause early collision, in this case of the holder 26.

Referring to FIGS. 13a to 13f, the method according to the invention therefore intends for a structuring of the flat surface 30 and/or plane into individual machining segments 44, 44', with the inclination angle α being maintained, while a different pivot angle β, β' is set for each machining segment 44, 44'. In other words, the flat surface 30 and/or plane are divided into machining segments 44, 44' when collisions are determined, and each of the machining segments 44, 44' is assigned or allocated a pivot angle β, β', around which the tool 10 is pivoted in parallel to the flat surface 30 and/or plane, to avoid collisions.

Figure 13A:
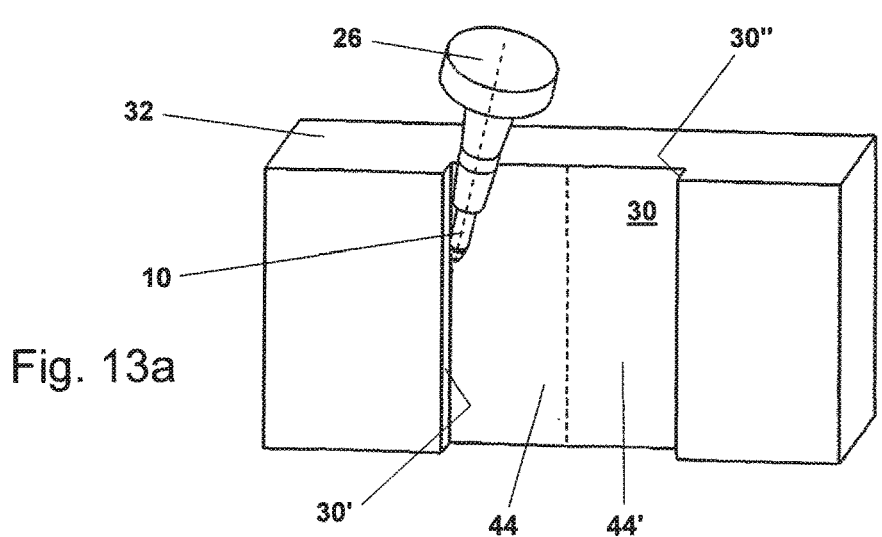

In the simplest case, as shown in FIG. 13a, the flat surface 30 is divided centered or essentially centered, i.e. into two equally sized or nearly equally sized machining segments 44, 44'. This leads to two flat surfaces 30 and/or planes that are only limited on one side anymore.

Then a dedicated collision-avoidance pivot angle β, β' in parallel to the flat surface 30 according to FIGS. 12a to 12g is determined for each of the flat surfaces 30.

Referring to FIGS. 13a to 13d, the tool 10 is lifted from the workpiece 32 after completion of the first machining segment 44, pivoted around and applied to the second machining segment 44' referring to FIGS. 13d to 13f. In this manner, complete and collision-free machining of the flat surface 30 is possible.

When working with different tool orientations β, β', the cutting contour 18, which is approximately conical or has a conically convex design, of the tool 10 has a highly positive effect. Many machines are unable due to inaccuracies in the pivot axes to adjust the required lateral inclination α identically in the two machining segments 44, 44' with the respective different pivot angles β, β'. When using a common, flat conical blade of the tool 10, this would lead to differently designed step effects in the machining segments 44, 44'. This would be particularly noticeable, since the machining segments 44, 44' are directly adjacent. The cutting contour 18, which has a conically convex design, of the blade 14 of the tool 10 designed according to the invention and/or of the method according to the invention can compensate a certain axis inaccuracy of the machine, in contrast to this, and thereby permits sensible execution of the described strategy for avoiding collisions in compliance with a required surface quality.

Figure 14A:
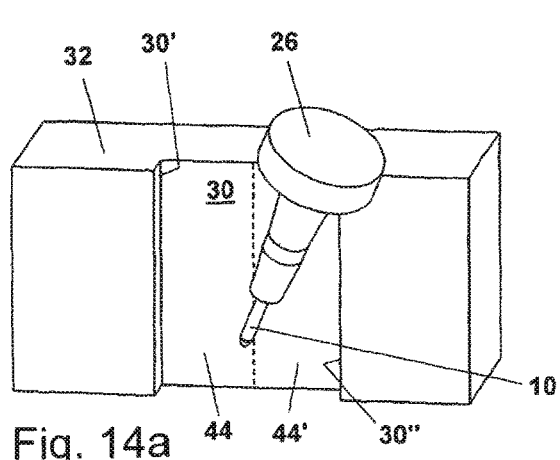
Figure 14B:
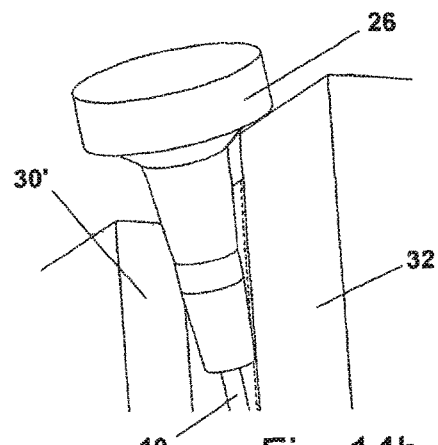
Figure 14C:
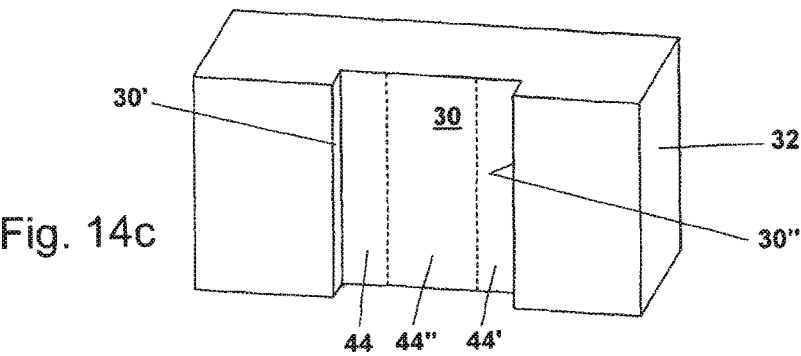

As schematically suggested in FIGS. 14a and 14c, it cannot always be excluded, no matter the above statements, that pivoting of the tool 10 may lead to collisions of the shaft 12 or of the holder 26 with the flat surface 30" and/or geometry adjacent to the second machining area 44' in certain situations after all in a machining segment 44. Such a situation results in particular in case of narrow and/or stripe-shaped flat surfaces 30 and/or planes or when using a comparatively broad holder 26 or large pivot angles ß, ß'.

According to FIGS. 14a and 14b, the holder 26 used so far in the previous examples has been replaced by a larger holder 26. When the front face 22 and/or front side and/or front and/or tip of the tool 10 reaches a certain depth in the first machining segment 44 in this context, the holder 26 hits the adjacent geometry at the top, such as the adjacent flat surface 30" to the right of the second machining segment 44'.

As shown in more detail in FIG. 14c, by the method according to the invention the flat surface 32 and/or plane is divided once again in this case. This leads to two reduced outer machining segments 44, 44' as well as an additional machining segment 44" in the middle.

Figure 14D:
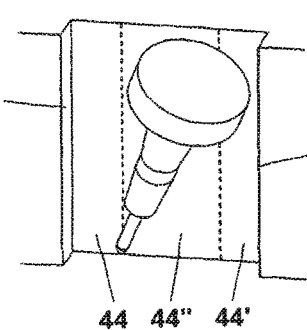
Figure 14E:
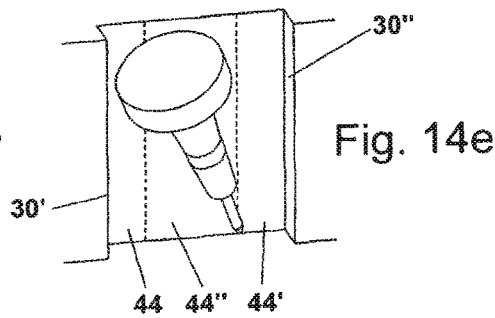

According to FIGS. 14d and 14e, the tool 10 is pivoted around a pivot angle ß, ß' parallel to the flat surface 30 and/or plane in each of the two outer machining segments 44, 44' as described. The reduced width of the machining segments 44, 44' now permits complete, collision-free machining in each case.

FIGS. 14d and 14e show that the tool holder 26 still complies with a certain distance from the component geometry, i.e. the adjacent left and right surfaces 30', 30", when the front face 22 and/or tip of the tool 10 is located at the inner edge of the machining segments 44, 44'. Thus, division of the flat surface 30 into the areas based on the predefined minimum distance between the shaft 12 and/or holder 26 and the component geometry is possible. The two outer machining segments 44, 44' are just wide enough that this minimum distance is complied with in all positions of the tool 10.

Figure 14F:
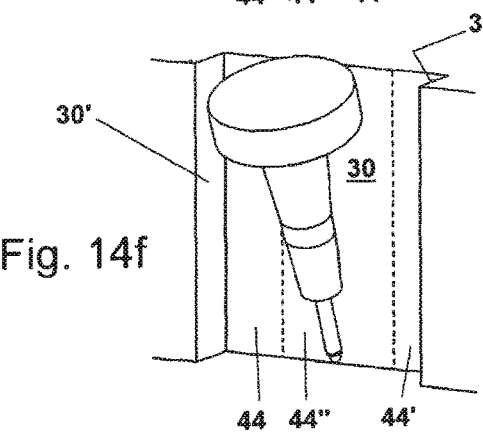
Figure 14G:
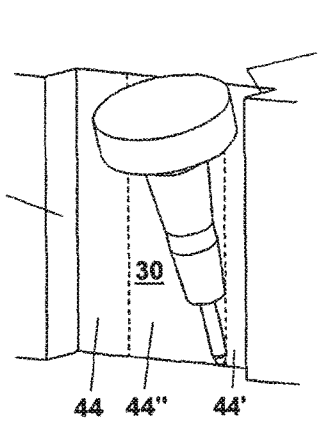

As FIGS. 14f and 14g show, this execution of the method according to the invention works without pivot angle ß, ß' in the middle machining segment 44", i.e. exclusively with a lateral inclination angle α according to a free-standing flat surface 30 according to FIGS. 9a to 9c.

Based on FIGS. 15a and 15b, another beneficial change of the method according to the invention for two-sided or bilateral limitation is explained, in which the flat surface 30 or the at least two machining segments 44, 44', 44" of the flat surface 30 is/are machined by the tool 10 in multiple passes. The pivot angle ß of the tool 10 of the at least one machining segment 44 is continuously interpolated to the pivot angle ß' of the tool 10 of the at least other machining segment 44' in this, and vice versa. Consequently, the tool 10 swings continuously back and forth in multiple passes across the machining segments 44, 44', 44" between the calculated pivot angles ß, ß'.

The division of the flat surface 30 and/or plane in machining segments 44, 44', 44" and the determination of the fixed pivot angle ß, ß' is only an interim step in any case.

Lifting off of the tool 10 from the workpiece 32 with subsequent pivoting around between the machining segments 44, 44', 44" is no longer required for this. The continuous movement of the tool 10 also offers advantages in collision avoidance, since only the corners—i.e. where it is actually required—will reach the maximum pivot angle ß, ß' that may potentially cause collisions with the respective opposite corners.

According to FIG. 15b, such a movement of the tool 10 may be equally beneficial in a unilateral limitation of the flat surface 30, as shown in FIGS. 10a to 10g. The pivot angle ß then runs continuously between 0° and/or a pre-defined minimum angle at the non-limited side and the pivot angle ß and/or ß' calculated with the method according to the invention to avoid collisions at the limited side, and/or vice versa.

In a fourth and last step, finally, the tool paths 46, 46' according to FIGS. 16a to 16f for the machining segments 44, 44', 44" are calculated.

Due to the first three steps, information is available on the inclination angle α against the flat surface 30 and/or plane and the pivot angle/s ß, ß' in parallel to the flat surface 30 and/or plane with which the tool 10 must be guided in each machining segment 44, 44', 44" of the flat surface 30. The tool paths 46, 46' are calculated based on this. The position information included in this always refers to a specific fixed reference point at the tool 10, usually the center of the front face 22 or another point on the axis of the tool 10.

Calculation of the tool paths 46, 46' is based on a specific pattern.

According to FIGS. 16a to 16d, the tool paths 46 preferably are horizontal or essentially horizontal. In any case, a pattern of horizontal passes will result.

Figure 16A:
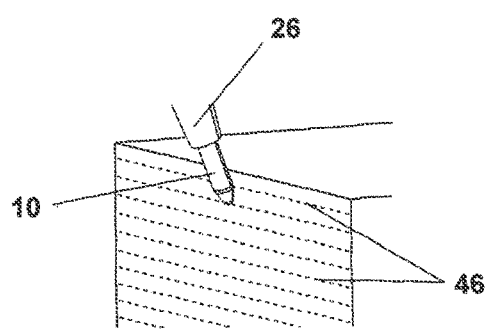
Figure 16B:
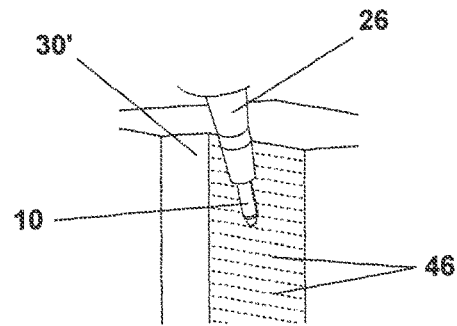
Figure 16C:
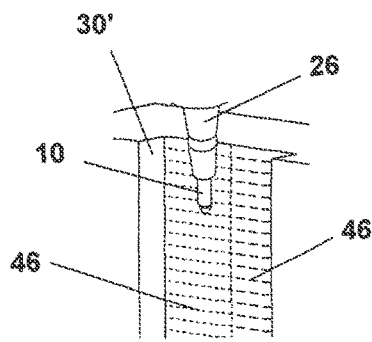

FIGS. 16a to 16c show example tool paths 46 for various embodiments, specifically FIG. 16a for collision freedom according to FIGS. 9a to 9c, FIG. 16b for one-sided limitation according to FIGS. 10a to 10g and FIG. 16c for two-sided or bilateral limitation according to FIGS. 13a to 13f. Here, the two machining segments 44, 44' are machined separately in sequence, as is made clear by the differently dashed lines.

Figure 16D:
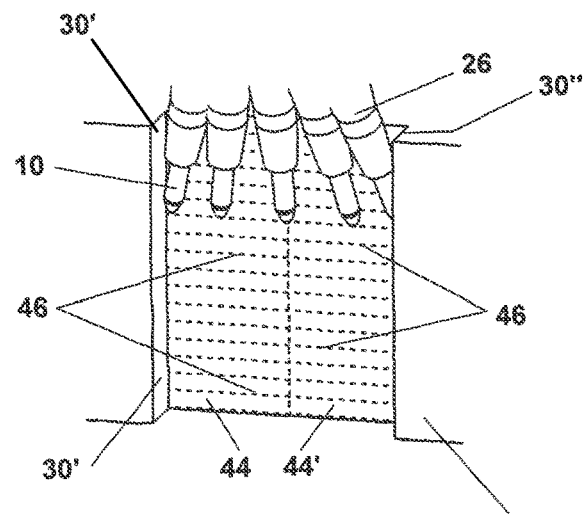

FIG. 16d further shows tool paths 46 in the embodiment according to FIG. 15a, in which a movement of the tool 10 swinging between the machining segments 44, 44' is performed. In this, the machining segments 44, 44' in each line are machined in sequence.

Such horizontal tool paths 46, as presented in FIGS. 16a to 16d, are found most often in practice in the area of plane machining.

Figure 16E:
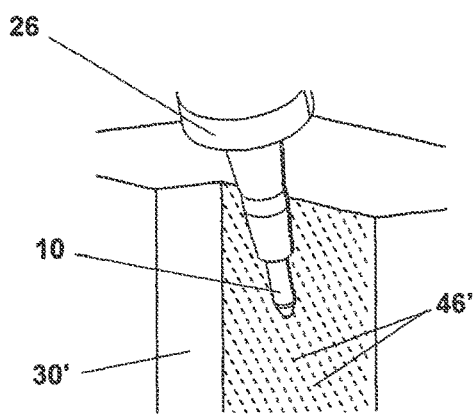

However, in principle, any other, for example diagonal, patterns are possible for the tool paths 46, 46' according to FIG. 16e as well. Without being illustrated in detail, the tool paths 46 in the machining segments 44, 44' could also be mapped with only horizontal, with only diagonal or a combination of horizontal and diagonal patterns as well.

Figure 16F:
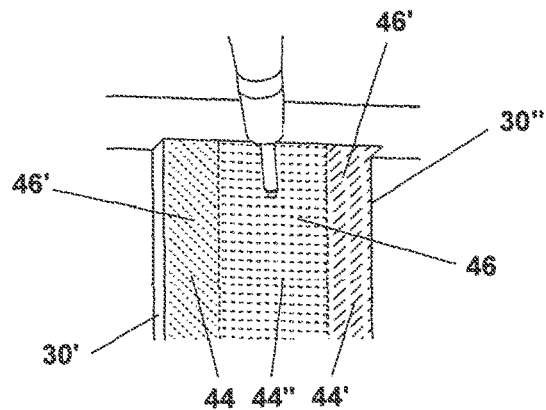

According to FIG. 16f, both patterns can also be used mixed if dividing into three machining areas 44, 44', 44". In the middle machining segment 44", a horizontal pattern is suggested as suitable for the tool paths 46, since this uses no pivot angle ß, ß', while the machining segments 44, 44' use diagonal patterns.

In all patterns of the tool paths 46, 46', the distance between the individual passes is a variable value. Obviously, it should not be any larger than the length of the almost conical blade 14, but may be smaller. Different parameters, such as the infeed, the revolutions, the surface accuracy to be achieved, or the selection of the contact point 34, can be introduced in the selection. The material of the workpiece 32 may also play a role here.

Figure 17A:
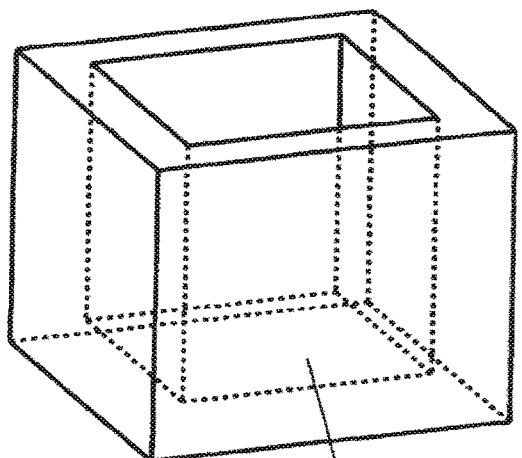
Figure 17B:
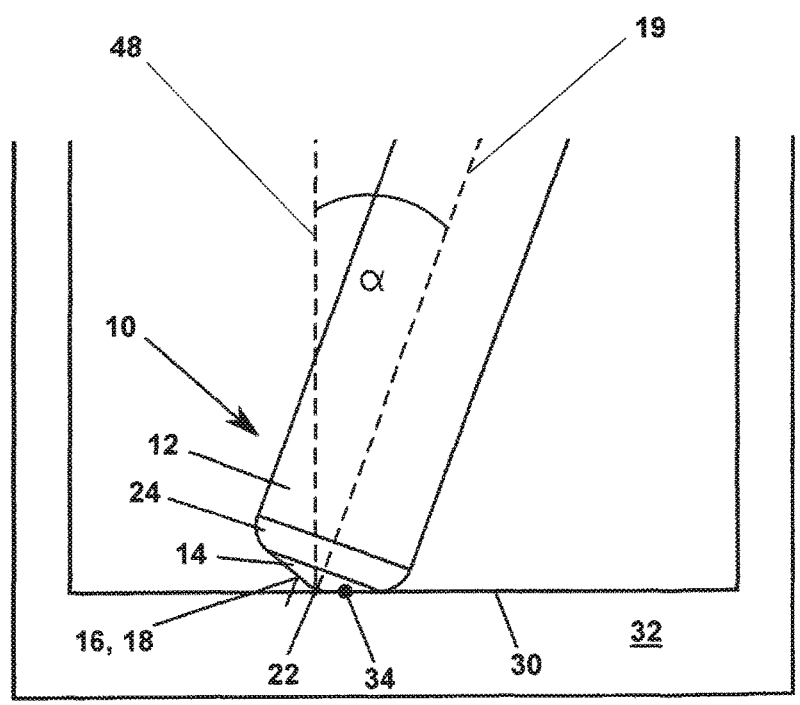

In the description of the first step of the method according to the invention according to FIGS. 5a to 8c so far, a vertical and/or inclined flat surface 30 and/or plane was assumed. However, the method according to the invention can also machine essentially horizontal flat surfaces 30 and/or planes, such as bottom surfaces of pockets, in the same manner, achieving the same technology advantages. In particular in the case of low flat bottom surfaces that are therefore difficult to reach, use of the embodiment of the tool 10 pursuant to FIGS. 4a and 4b is very suitable, as shown in FIGS. 17a and 17b. Due to the steeper cutting contour 18, the tool 10 only requires a slight inclination angle α between the tool axis 19 and the vertical 48 of the surface 30 for application or adaption to the flat bottom surface 30. Thus, the flat surface 30 of the bottom can be reached and machined easily even in deep pockets that are difficult to access.

The invention is not limited to the illustrated embodiments of the method according to the invention according to FIGS. 1a to 17b. Thus, it is possible to combine the embodiments of the method according to the invention among or with each other in any manner. Furthermore, the invention is entirely independent of the type of machining, i.e. in particular of a roughing or smoothing processing, even if the method according to the invention is preferably and most specifically suitable for use in smoothing by machining. Finally, the method according to the invention can be used to machine flat surfaces of any kind, size, shape and/or arrangement, such as vertical surfaces, surfaces of any inclination and horizontal flat surfaces 30 and/or planes of, for example, rectangular, non-rectangular, e.g. trapezoidal or triangular or curved contours, in particular bottom surfaces of pockets, to avoid a one-sided and/or two-sided collision.

The invention claimed is:

1. Method for machining of flat surfaces (30) of a workpiece (32) using a tool (10) which is laterally inclined (α) against a flat surface (30), guided with a contact point (34) on the flat surface (30) and moved in a collision-free manner, wherein the flat surface (30) is machined using a tool (10) with a cutting contour (18), which has a conically convex design, at one flank (16) of the tool (10), and to avoid a one-sided collision completely machined by the tool (10) with a pivot angle (ß) in parallel to the flat surface (30) and to avoid a two-sided collision by the tool (10) with at least two different pivot angles (ß, ß') in parallel to the flat surface (30), wherein the flat surface (30) is divided into at least two machining segments (44, 44', 44") to avoid the two-sided collision collision and each of the at least two machining segments (44, 44', 44") is assigned an individual pivot angle (ß, ß') of the tool (10) to avoid collision,
wherein in case of the one-sided collision the flat surface is machined in multiple passes and the pivot angle runs continuously between a pre-defined minimum angle at a non-limited side and said pivot angle, and wherein in case of the two-sided collision the at least two machining segments of the flat surface are machined by the tool in multiple passes, with the pivot angle of the tool of the at least one machining segment being continuously interpolated with the pivot angle of the tool of the at least other machining segment, and vice versa, such that the tool swings continuously back and forth in multiple passes across the at least two machining segments between the calculated pivot angles.

2. Method according to claim 1, characterized in that the tool (10) is laterally inclined against the flat surface (30) in such a way that the contact point (34) of the cutting contour (18), which has a conically convex design, at the flank (16) of the tool (10) on the flat surface (30) is in an upper area (36) facing the shaft (12) of the tool (10).

3. Method according to claim 1, characterized in that the tool (10) is moved in multiple passes from bottom up across the flat surface (30) and is laterally inclined against the flat surface (30) in such a way that the contact point (34) of the cutting contour (18), which has a conically convex design, at the flank (16) of the tool (10) on the flat surface (30) is in an area (38) between the middle of the cutting contour (18) and an upper area (36) facing the shaft (12) of the tool (10).

4. Method according to claim 1, characterized in that the tool (10) is moved in multiple passes from top down across the flat surface (30) and is laterally inclined against the flat surface (30) in such a way that the contact point (34) of the cutting contour (18), which has a conically convex design, at the flank (16) of the tool (10) on the flat surface (30) is in an area (40) between the middle of the cutting contour (18) and a lower area (42) facing the front face (20, 22) of the tool (10).

5. Method according to claim 1, characterized in that the tool (10) is laterally inclined against the flat surface (30) in such a way that the contact point (34) of the cutting contour (18), which has a conically convex design, at the flank (16) of the tool (10) on the flat surface (30) is in a lower area (42) facing the front face (20, 22) of the tool (10).

6. Method according to claim 1, characterized in that the lateral inclination (α) of the tool (10) against the flat surface (30) is maintained unchanged throughout machining.

7. Method according to claim 1, characterized in that the collision freedom and possible one-sided and/or two-sided collisions with the geometry of the workpiece (32) are tested.

8. Method according to claim 1, characterized in that the tool path/s (46) of the tool (10) for the flat surface (30) and/or the at least two machining segments (44, 44', 44") is/are calculated.

9. Method according to claim 1, characterized in that the tool (10) is guided across the flat surface (30) or the at least two machining segments (44, 44', 44") of the flat surface (30) in multiple passes.

10. Method according to claim 1, characterized in that the tool (10) is guided across the flat surface (30) or the at least two machining segments (44, 44', 44") of the flat surface (30) in horizontal and/or diagonal passes.

11. Method according to claim 1, characterized in that the flat surface (30) or the at least two machining segments (44, 44', 44") of the flat surface (30) is/are machined using a tool (10), with its cutting contour (18), which has a conically convex design, at the flank (16) of the tool (10) being formed by a conical contour with a conical angle between the conical contour and the axis of the tool (10) and a convex bulge going out from the conical contour.

12. Method according to claim 1, characterized in that the flat surface (30) or the at least two machining segments (44, 44', 44") of the flat surface (30) is/are machined using a tool (10), with its cutting contour (18), which has a conically convex design, at the flank (16) of the tool (10) being formed as a circle segment or ellipsoid segment with a curve radius $R_K \geq 250$ mm.

13. Method according to claim 1, characterized in that the flat surface (30) or the at least two machining segments (44, 44', 44") of the flat surface (30) is/are machined using a tool (10), with its cutting contour (18), which has a conically convex design, at the flank (16) of the tool (10) being formed as a circle segment, ellipsoid segment or curve segment with a constant or varying curve radius $R_K$.

14. Method according to claim 1, characterized in that the flat surface (30) or the at least two machining segments (44, 44', 44") of the flat surface (30) is/are machined using a tool (10), with its cutting contour (18), which has a conically convex design, at the flank (16) of the tool (10) being formed symmetrically or asymmetrically.

15. Method according to claim 1, characterized in that the flat surface (30) or the at least two machining segments (44, 44', 44") of the flat surface (30) is/are machined using a tool (10), with its cutting contour (18), which has a conically convex design, at the flank (16) of the tool (10) directly transferring to the shaft (12) of the tool (10).

16. Method according to claim 1, characterized in that the flat surface (30) or the at least two machining segments (44, 44', 44") of the flat surface (30) is/are machined using a tool (10), with its cutting contour (18), which has a conically convex design, at the flank (16) of the tool (10) indirectly transferring to the shaft (12) of the tool (10) via a rounded transfer (24).

17. Method according to claim 1, characterized in that the flat surface (30) or the at least two machining segments (44, 44', 44") of the flat surface (30) is/are machined using a tool (10), with its cutting contour (18), which has a conically convex design, at the flank (16) of the tool (10) transferring to a flat front face (20) of the tool (10).

18. Method according to claim 1, characterized in that the flat surface (30) or the at least two machining segments (44, 44', 44") of the flat surface (30) is/are machined using a tool (10), with its cutting contour (18), which has a conically convex design, at the flank (16) of the tool (10) transferring to a spherical front face (22) of the tool (10).

19. Method according to claim 1,
   wherein the shape of the conically convex cutting contour is formed by a conical contour with a conical angle and a convex bulge of this contour such that the tool has a cutting contour of conical shape that does not run linearly conical but bulges in a convex shape.

\* \* \* \* \*